US012755917B2

(12) United States Patent
Stephens et al.

(10) Patent No.: US 12,755,917 B2
(45) Date of Patent: Oct. 6, 2026

(54) SEALED ELECTRICAL DEVICES

(71) Applicant: Sensata Technologies, Inc., Attleboro, MA (US)

(72) Inventors: Joseph Avery Rajeski Stephens, Santa Barbara, CA (US); Chia-Kai Kevin Jui, Ventura, CA (US); Derek Hodge Turner, Taunton, MA (US); Kenny Chui, Oxnard, CA (US)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 19/053,232

(22) Filed: Feb. 13, 2025

(65) Prior Publication Data

US 2026/0237583 A1 Aug. 13, 2026

(51) Int. Cl.
*H01H 71/02* (2006.01)
*H01H 1/64* (2006.01)

(52) U.S. Cl.
CPC .......... *H01H 71/0207* (2013.01); *H01H 1/64* (2013.01); *H01H 2223/002* (2013.01); *H01H 2223/044* (2013.01)

(58) Field of Classification Search
CPC ................. H01H 71/0207; H01H 1/64; H01H 2223/002; H01H 2223/044
USPC .......................................................... 335/156
See application file for complete search history.

(56) References Cited

U.S. PATENT DOCUMENTS

| | | | | |
|---|---|---|---|---|
| 10,541,391 | B2 | 1/2020 | Hyung et al. | |
| 11,443,910 | B2 * | 9/2022 | Bush | H01H 89/00 |
| 2007/0109083 | A1 * | 5/2007 | Dettmers | H05K 5/06 335/202 |
| 2011/0156845 | A1 * | 6/2011 | Eum | H01H 51/065 335/154 |
| 2013/0214884 | A1 * | 8/2013 | Ito | H01H 45/00 335/154 |
| 2017/0148596 | A1 * | 5/2017 | Ozaki | H01H 50/14 |
| 2022/0230824 | A1 * | 7/2022 | McTigue | H01H 50/14 |

FOREIGN PATENT DOCUMENTS

| | | |
|---|---|---|
| CN | 218351760 U | 1/2023 |
| EP | 4033511 A2 | 7/2022 |

OTHER PUBLICATIONS

Extended European Search Report for European Application No. 26157995.7, dated Jul. 17, 2026, 9 pages.

* cited by examiner

*Primary Examiner* — Shawki S Ismail
*Assistant Examiner* — Lisa N Homza
(74) *Attorney, Agent, or Firm* — Lee & Hayes, P.C.

(57) ABSTRACT

A hermetically-sealed electrical device includes a housing and a header assembly. The header assembly includes a cover having a contact aperture and a contact terminal extending through the cover via the contact aperture. An insulating member insulates the contact terminal from the cover. An angled flange couples the insulating member to the cover. The cover may be coupled to the housing to form a hermetically sealed volume.

20 Claims, 4 Drawing Sheets

SEALED ELECTRICAL DEVICES

FIELD OF THE TECHNOLOGY

The subject disclosure relates to electrical switching devices, such as contactor devices and electrical fuse devices, and more particularly to improved sealed electrical switching devices.

BACKGROUND OF TECHNOLOGY

Many conventional devices are known to selectively power on or off electrical devices. For example, electrical contactors, e.g., high-voltage DC contactors, and fuses, e.g., electrical fuses and/or pyrotechnic fuses, are conventionally available and used in electrical systems. Contactors may be configured to interrupt or complete a circuit to control electrical power to and from a device. Fuses may be used for overcurrent protection. For example, fuses may be used to prevent short circuits, overloading, and/or permanent damage to an electrical system or a connected electrical device.

Many contactors and fuses, including those used in high-voltage, direct-current applications, make use of an electrically-insulative, hermetically-sealed assembly that allows the internal atmosphere of the device to be controlled. Some conventional contactors and fuses include contact terminals coupled, e.g., by brazing, to metallic, e.g., aluminum, surfaces. However, these conventional sealing technologies and arrangements may be subject to premature failure, such as by bursting from pressure build-up and/or by cracking under side loads applied at the contact terminals. These and other shortcomings in conventional devices can cause inferior thermal and/or electrical performance.

Accordingly, there is a need in the art for improved hermetically-sealed contactors and fuses and methods of making such contactors and fuses.

SUMMARY OF THE TECHNOLOGY

The subject technology relates to improved electrical devices and methods of making those devices. In examples, aspects of this disclosure relate to improved hermetically-sealed contactors and fuses that incorporate a header assembly that includes a cover and one or more contact terminals extending through the cover. The terminal(s) are insulated from the cover by an insulating member. In aspects, the present disclosure relates to improved hermetically-sealed contactors and fuses that include a header assembly that is coupled, e.g., by resistance welding, to a can or housing. For example, such contactors and fuses may be less expensive and/or more reliable than some existing contactors and fuses. Also in examples, the electrical devices described herein may be more compact than some conventional devices. Additional aspects of this disclosure relate to methods of making improved hermetically-sealed contactors and fuses.

BRIEF DESCRIPTION OF THE DRAWINGS

So that those having ordinary skill in the art to which the disclosed systems and techniques pertain will more readily understand how to make and use the same, reference may be had to the following drawings.

DETAILED DESCRIPTION

The subject technology overcomes many of the prior art problems associated with hermetically-sealed electrical devices. In brief summary, aspects of the subject technology may provide improved hermetically-sealed electrical devices. Some aspects of this disclosure include an improved header assembly for an electrical device that includes, at least in part, an insulating member disposed between a cover and a contact terminal extending through the cover. Some aspects of this disclosure also describe methods of manufacturing the header assembly. Additional aspects of this disclosure relate to an electric device including the header assembly and methods of manufacturing the improved electrical device.

Without limitation, the devices and techniques described herein may provide hermetically-sealed devices that are cheaper to manufacture than similar conventional devices. Moreover, the devices and techniques described herein may provide superior thermal and electrical performance relative to similar conventional devices. The devices and techniques described herein may also provide hermetically-sealed contactors and fuses that use lower-cost manufacturing methods. In some instances, these methods can be employed on less expensive raw materials. Moreover, some of the header assemblies described herein may be more compact than conventional assembles, which may facilitate an overall size reduction of the devices with which the assemblies are used and of systems incorporating such devices.

The devices and techniques may also or alternatively facilitate the use of different and/or more preferred materials to perform functions required of the electrical device. For example, and without limitation, the devices and techniques described herein may allow for the use of steel for the cover and/or housing. Steel may provide improved strength and/or resistance to thermal shock relative to conventional materials.

However, this disclosure is not limited to these improvements, and not all implementations of the devices and techniques described herein may result in these improvements. Moreover, while aspects of this disclosure may be particularly useful in electrical devices, such as contactors and fuses, the systems and techniques described herein may be useful with many hermetically-sealed applications.

Aspects of the disclosure will now be explained in more detail with reference to the Figures.

Figure 1:
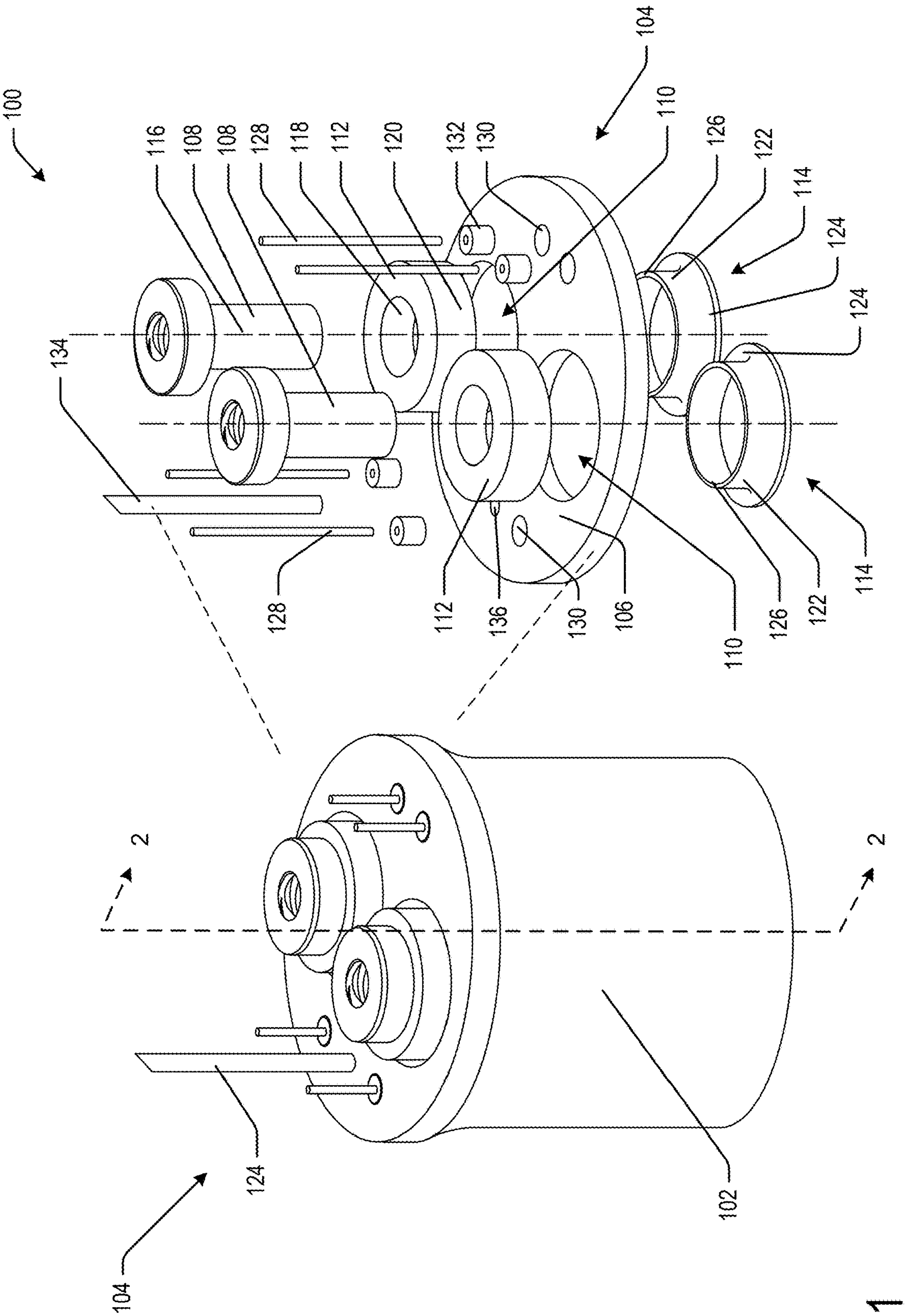
FIG. 1 includes a perspective view of an electrical device and an exploded perspective view of a portion of the electrical device, in accordance with aspects of this disclosure.

FIG. 1 is a perspective view of an electrical device 100, which may be a contactor device, a fuse device, a pyrotechnic fuse, a pyrotechnic contactor, and/or the like. The electrical device 100 generally includes a body or housing 102, and a header assembly 104 disposed to cover an opening of the housing 102. In the illustrated example, the header assembly 104 is secured to the housing 102 to seal a top opening of the housing 102.

Visible in FIG. 1, the header assembly 104 includes a plate or cover 106 and two fixed contact structures 108 extending through the cover 106. In examples, the housing 102 may be formed as a base body, a "can," or a "cup," e.g., defining a substantially circular opening. The assembly 104 may be a header sealed to the housing 102, e.g., at the circular opening to seal the interior of the housing 102. As discussed below in connection with FIG. 2A, the housing 102 is configured to contain a number of internal components.

The contact structures 108 are configured to electrically connect the internal components of the electrical device 100 to external circuitry, for example, to an electrical system or device. For example, the contact structures 108 may be contact terminals configured to facilitate connection of electrical leads (not shown). In one non-limiting example, a power source may be coupled to one of the contact structures 108 and a load to be powered by the power source may be coupled to the other of the contact structures 108.

The housing 102 can generally include any suitable material that can support the structure and function of the electrical device 100. The housing 102 may be selected and/or configured to facilitate improved coupling to the header assembly 104. For example, the housing 102 may be configured for resistance welding to the header assembly 104. In these examples, the housing 102 may be made of a metal such as stainless steel. Also in examples, the housing 102 may be plated, e.g., by an electroless nickel plating. Similarly, in examples of this disclosure, the cover 106 may be formed of a metallic material, such as steel, including but not limited to stainless steel, low carbon steel, and/or other materials.

The housing 102 can be configured such that an internal space of the housing 102, e.g., which houses the various internal components of the electrical device 100, is hermetically sealed. An electronegative gas may be disposed in the housing 102. This hermetically sealed configuration can help mitigate or prevent electrical arcing between adjacent conductive elements, and in some embodiments, helps provide electrical isolation between spatially separated contacts. In some examples, the housing 102 can be under vacuum conditions and/or can be hermetically sealed using known means of generating hermetically sealed electrical devices. As also detailed herein, in some examples, the devices and techniques detailed herein may facilitate the use of hydrogen in the housing.

As illustrated in FIG. 1, the header assembly 104 generally includes the cover 106 and a number of additional components. The cover 106 includes a number of holes or apertures formed therein, including a pair of contact apertures 110. Each of the contact apertures 110 is sized and positioned to receive one of the contact structures 108. As shown in FIG. 1, an insulating member 112 and a spacer 114 also are disposed in each of the contact apertures 110.

More specifically, and as shown best in the exploded view of FIG. 1, each of the contact structures 108 has an elongate body 116, e.g., shown as a generally cylindrical body in the example. The elongate body 116 is configured to extend through the cover 106, e.g., such that a first end (a lower end in the orientation of FIG. 1) of the elongate body 116 is disposed in a volume defined by the housing 102 and a second end (the upper end in the orientation of FIG. 1) is disposed outside the volume. In the example, the contact structures 108 also include a flanged end, extending radially relative to the elongate body 116 at the second, upper end.

The insulating member 112 is illustrated as being ring-shaped. For example, the insulating member 112 may be an eyelet. The insulating member 112 has an inner surface 118 having a diameter that is sized to circumscribe the elongate body 116 of the contact terminals 108. In examples of this disclosure, the diameter of the inner surface 118 of the insulating member 112 may be sized to provide a clearance between the elongate body 116 and the insulating member 112. In other examples, the inner surface 118 may contact the elongate body 116. The insulating member 112 also has an outer surface 120. In examples of this disclosure, the outer surface 120 has an outer diameter that is smaller than a diameter of the contact aperture 110. Accordingly, in some examples, the insulating member 112 can be at least partially disposed in the contact aperture 110. Without limitation, the diameter of the outer surface 120 of the insulating member 112 may provide a clearance between the insulating member 112 and the associated contact aperture 110. The insulating member 112 may be a ceramic material and/or any material or blend of materials that can provide thermal and/or electrical insulation. As detailed herein, the insulating member 112 may insulate the contact structures 108 from the cover 106 and/or from the spacer 114 coupled to the cover 106.

The spacer 114 is configured to couple the insulating member 112 to the cover 106. In examples of this disclosure, the spacer 114 is a flanged or bent spacer that includes a first portion 122 and a second portion 124 bent or angled relative to the first portion 122. In the illustrated example, the first portion 122 is substantially cylindrical, having an axis generally corresponding to an axis of one of the contact apertures. The second portion 124 is substantially perpendicular to (e.g., angled 90-degrees relative to or within a threshold angle of 90-degrees) the first portion 122. As will be appreciated, the shape of the spacer 114 results in an edge 126 of the spacer 114 being spaced from the second portion 124 of the spacer, e.g., by a longitudinal extent of the first portion 122. As detailed further herein, the edge 126 of the spacer 114 may be coupled to the insulating member, e.g., to a radial surface of the insulating member, and the second portion 124 may be coupled to the cover 106.

In examples of this disclosure, the spacer 114 may be metallic, such as a low carbon steel. The spacer 114 may be formed using known processes, including cold-forming processes. In examples, the spacer 114 may be coupled to the insulating member 112 and/or to a surface of the cover 106 using conventional techniques, such as brazing, welding, and/or the like. In examples, the surface of the insulating member 112 to which the spacer 114 is to be coupled may be a metallized surface, e.g., a thin metallic layer formed on the insulating member 112 that facilitates a metal-to-metal connection. The insulating member 112 may also include a second metallized surface to which the contact structure 108 is coupled. Thus, the components of the header assembly 104 may be relatively simple parts made from relatively commonplace materials and processes.

In arrangements described herein, each of the contact structures 108 is coupled to the insulating member 112, the insulating member 112 is coupled to the spacer 114, e.g., at the edge 126 of the spacer 114, and the spacer 114 is coupled to the cover 106. Accordingly, the insulating member 112 is positioned thermally and/or electrically "between" the contact structure 108 and the spacer 114/cover 106. In examples, the contact structure 108 may be made from a high-current capacity material, such as copper. However, the contact structure 108 must be insulated from the cover 106 and/or the housing 102. Conventionally, insulating materials, such as ceramic, alumina, and/or other dielectric materials have been used for the cover 106. However, these materials may be expensive, difficult to work with, and/or, have other shortcomings. For example, alumina may be insufficiently robust, because it may be prone to rupture and/or cracking under higher pressures. Instead, in examples of this disclosure, the insulating member 112 can facilitate the use of more robust materials, such as steel, for the cover 106.

As also illustrated in FIG. 1, the cover 106 can include a number of additional apertures, e.g., through which other or additional components can extend into the sealed space defined by the housing 102 and the header assembly 104. For example, FIG. 1 shows a number of feedthroughs 128 (four in FIG. 1) extending through corresponding feedthrough apertures 130 in the cover 106. In examples, the feedthroughs 128 may be electrical leads or the like. As also illustrated, glass seals 132 may be disposed in the feedthrough apertures 130, with the feedthroughs 128 passing through the glass seals 132. In examples, the glass seals 132 may facilitate sealing of the feedthroughs 128 to the cover 106, via glass-to-metal sealing, at the feedthrough apertures 130. Although four feedthroughs 128 are illustrated in FIG. 1, more or fewer may be provided.

The header assembly 104 also is illustrated as including a tube 134 that passes through the cover 106. More specifically, the cover 106 includes a tubing aperture 136 sized to receive the tube 134. For example, the tube 134 may be used to evacuate air in the housing 102, e.g., during the sealing process, to vent excess air in the housing, e.g., during a fault event, to supply a gas, such as an electronegative gas like hydrogen, to the housing 102, and/or the like. Although only one tube 134 is shown, the assembly 104 could include additional (or no) tubes.

Figure 2A:
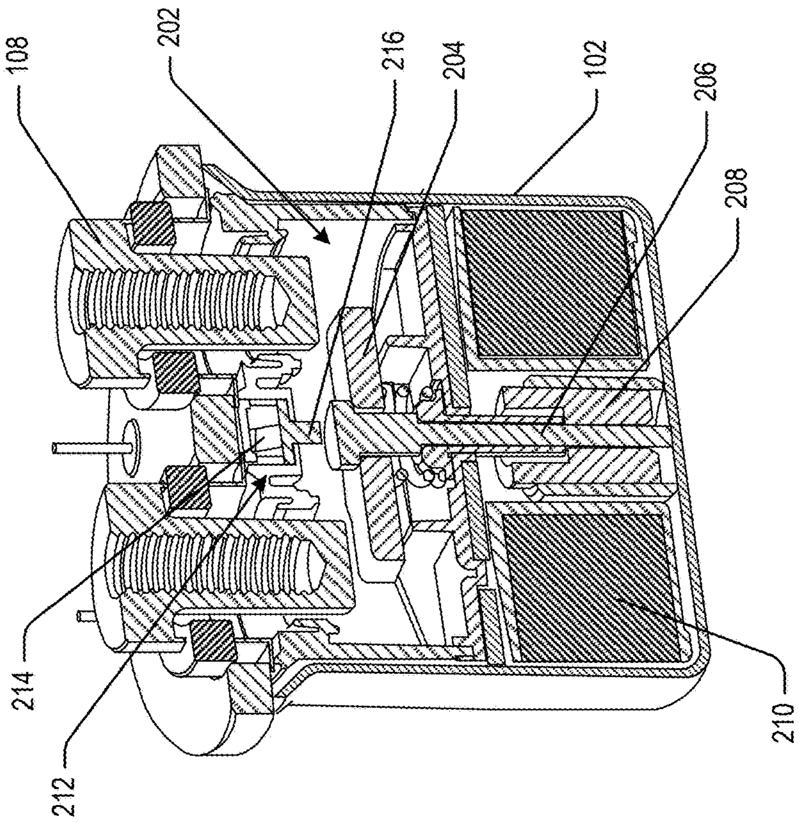
FIG. 2A is a perspective, cross-sectional view of the electrical device of FIG. 1, taken along section line 2-2 in FIG. 1, in accordance with aspects of this disclosure.
Figure 2B:
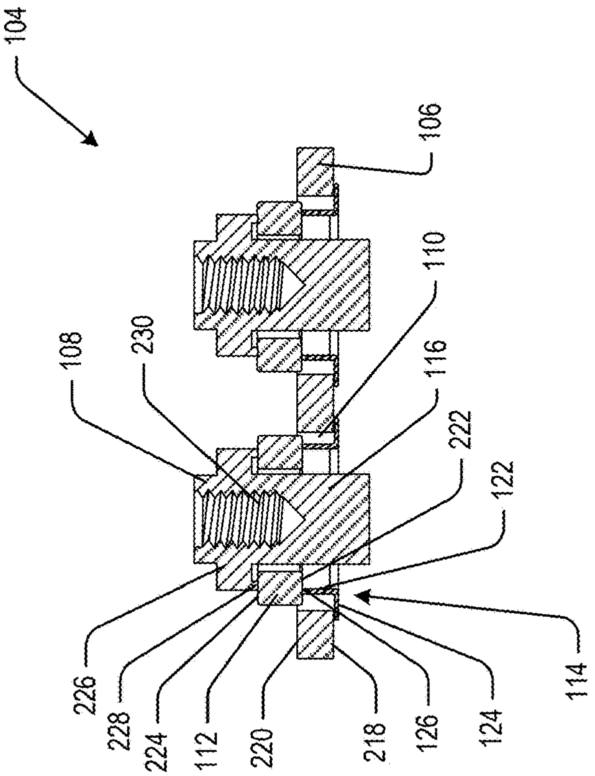
FIG. 2B is a cross-sectional view of a header assembly portion of the electrical device of FIG. 1, taken along section line 2-2 in FIG. 1, in accordance with aspects of this disclosure.

FIGS. 2A and 2B are cross-sectional views of the electrical device 100 taken along the section line 2-2 in FIG. 1. FIG. 2A shows the contact structures 108 extending through the cover 106 and into an interior 202 of the housing 102. As detailed herein, aspects of this disclosure allow for the interior 202 of the housing 102 to be hermetically sealed. For example, at least a portion of the interior 202 may be an arc chamber. The arc chamber may be filled with a gas, such as hydrogen, that facilitates arc suppression.

A number of internal components also are shown in the interior 202. For example, FIG. 2A shows a movable contact 204 disposed on a distal end of a movable shaft 206. As is conventional in the art, the shaft 206 may be selectively movable to configure the movable contact 204 in a first position contacting the contact structures 108, e.g., to allow for current flow between the contact structures 108, and a second position (illustrated) in which the movable contact 204 is spaced from the contact structures 108. In the illustrated example, an end of the shaft 206 opposite the movable contact 204 includes a plunger 208. The plunger 208 extends into an opening defined by a coil 210, e.g., an electromagnetic coil. The electromagnetic coil 210 may be selectively energized to cause the plunger 208 (and thus the shaft 206 and the movable contact 204) to move relative to the contact structures 108. In the illustrated example, the coil 210 is illustrated as being disposed in the housing 102, e.g., in the hermetically sealed environment. Other electrical devices are known that include a coil external to the hermetically-sealed environment. Aspects of this disclosure can also be used with electrical device of this or any other type, as will be appreciated by those having ordinary skill in the art with the benefit of this disclosure. By way of non-limiting example, the header assembly 104 described herein may be used with electrical devices that are not sealed.

FIG. 2A also shows an interrupt mechanism 212, e.g., proximate an inner surface of the cover 106 and between the contact structures 108. In examples, the interrupt mechanism can include a triggering device 214, which may be a pyrotechnic trigger, for example, and a projectile 216. In operation, the triggering device 214 may detonate in response to an overcurrent, a power surge, arcing, or some other event. The detonation applies a force that causes the projectile 216 to strike the shaft 206, driving the shaft 206 (and thus the movable contact 204) away from the contact structures 108, thereby inhibiting current flow through the electrical device 100. Although the example of FIG. 2A shows the interrupt mechanism 212, this is for example only. Many different types of electrical devices including (or not including) any number of features can benefit from the header assembly 104 detailed herein. Moreover, aspects of the header assembly 104 can be modified to work with any number of electrical devices. Without limitation, the size and/or shape of the cover 106 can be altered, the arrangement, composition, and/or styling of the contact structures 108 may vary, the type and/or inclusion of an interrupt can vary, and/or the like.

Although FIG. 2A shows the electrical device 100 as including various internal and external components, FIG. 2A is for example only. Aspects of this disclosure can be used with any number or types of electrical devices that include a header assembly and a housing, like the header assembly 104 and the housing 102.

FIG. 2B is a cross-sectional view of the header assembly 104 of the electrical device 100 taken along the section line 2-2 in FIG. 1. FIG. 2B shows the positioning and interplay of the features of the header assembly, including the cover 106, the contact structures 108, the insulating member 112, and the spacer 114 in more detail.

As illustrated in FIG. 2B, the cover 106 includes a lower surface 218 and an upper surface 220, spaced by a thickness of the cover 106. In examples, the lower surface 218 may be coupled to an upper edge or lip of the housing 102 (not shown). In the illustrated example, the second portion 124, e.g., the flange, of the spacer 114, is coupled to the lower surface 218 of the cover 106 proximate the contact aperture 110. As shown, the radial extent of the second portion 124 of the spacer 114 is larger than a diameter of the contact aperture 110, such that the second portion 124 extends radially beyond the contact aperture 110 to contact the lower surface 218 of the cover 106. At this point of contact, the second portion 124 can be secured to the cover 106, e.g., via welding, brazing, and/or other conventional joining processes.

As also illustrated in FIG. 2B, the first portion 122 of the spacer 114 extends into the contact aperture 110. Specifically, a radial extent (e.g., a diameter) of the first portion 122 of the spacer 114 is less than a diameter of the contact aperture 110. Accordingly, the first portion 122 is circumscribed by the contact aperture 110, and/or a clearance is formed between the first portion 122 and the contact aperture 110. An axial or longitudinal extent of the first portion 122, in the example of FIG. 2B, is less than the thickness of the cover 106, such that the edge 126 of the spacer 114 is disposed within the contact aperture 110. In other examples, the first portion 122 may be longer or shorter and/or wider or narrower.

The edge 126 of the first portion 122 is coupled to a first side 222 of the insulating member 112. As illustrated, the edge 126 is coupled such that the first portion 122 extends substantially perpendicularly from the first side 222 of the insulating member 112. In examples, the first side 222 of the insulating member 112 can be a metallized layer, e.g., formed through deposition or other conventional processes. The first portion 122 of the spacer 114 may be brazed, welded, or otherwise secured to the first side 222.

As described herein, the insulating member 112 also is coupled to the contact structure 108. As shown in FIG. 2B, the insulating member 112 includes a second side 224 opposite, e.g., spaced axially from, the first side 222 to which the spacer 114 is coupled. As also illustrated, the contact structure 108 may include a flange 226 that extends radially outwardly from the elongate body 116. The flange 226 is illustrated as including a protrusion 228 resulting from an undercut formed at a junction of the flange 226 and the body 116. In examples, the protrusion 228 may not be included, e.g., the flange 226 may directly contact the second side 224 of the insulating member. In examples, the flange 226, e.g., at the protrusion 228, is coupled to the second side 224 by brazing, welding, and/or some other conventional joining process.

As illustrated in FIG. 2B, the contact structure 108 and the insulating member 112 are sized such that a space or clearance is provided between the inner surface 118 of the insulating member 112 and an outer surface of the contact structure. In other examples, however, the inner surface 118 of the insulating member 112 may contact the contact structure 108, e.g., so long as the insulating member 112 can still insulate the contact structure 108 from the spacer 114 and the cover 106. As also illustrated in FIG. 2B, the contact structures 108 may include a threaded bore 230. The threaded bore 230 may be used in some conventional devices to facilitate threaded connection of a power supply and/or power load.

As noted above, as a result of the arrangement of FIG. 2B, the contact structures 108 are insulated from the cover 106 (and the spacer 114) by the insulating member 112. In the example of FIG. 2B, the insulating member 112 is partially disposed in the contact aperture 110, but extends above or protrudes from the upper surface 220 (e.g., the exterior surface) of the cover 106. As also noted above, the axial extent of the first portion 122 of the spacer 114 may be varied, which will result in different axial positioning of the insulating member 112 and the contact structure 108, e.g., relative to the cover 106. As will be appreciated, by securing the second portion 124 of the spacer 114 to the lower surface 218 and having the spacer extend into the contact aperture 110, an extent to which the contact structures 108 extend above the cover 106 can be reduced, e.g., relative to an arrangement in which the second portion 124 of the spacer 114 is placed on top of the upper surface 220.

Figure 3:
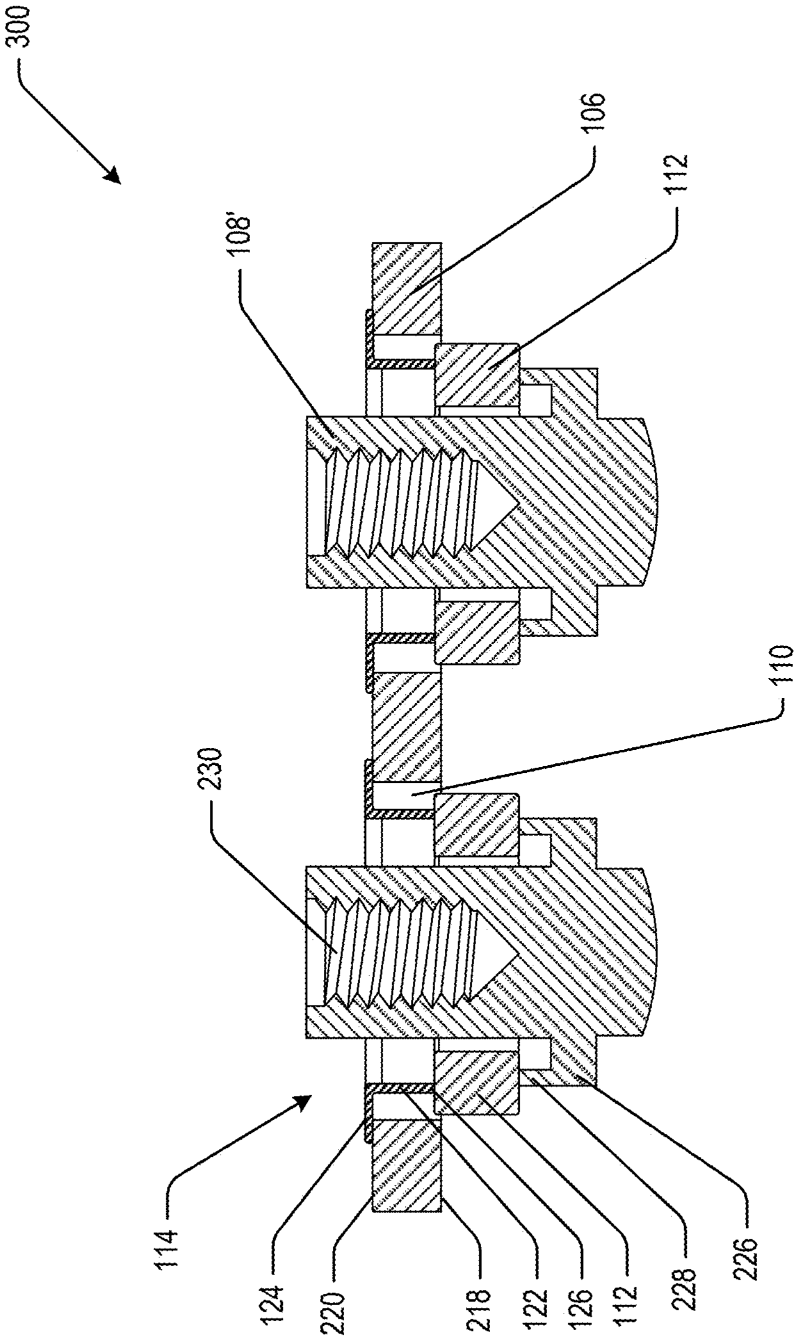
FIG. 3 is a cross-sectional view of an alternative header assembly portion of an electrical device, in accordance with aspects of this disclosure.

FIG. 3 illustrates an alternative arrangement of a header assembly 300 according to additional examples of this disclosure. In FIG. 3, reference numerals used previously are used to reference the same components.

FIG. 3 generally shows that the header assembly 300 includes the cover 106 having the contact apertures 110 and alternative contact structures 108'. Each of the alternative contact structures 108' is coupled to the insulating member 112, and the insulating member 112 is further coupled to the cover 106 by the spacer 114. Aspects of the header assembly 300, however, are "flipped" relative to the header assembly 104 discussed above.

As shown in FIG. 3, the second portion 124 of the spacer 114 is coupled to the upper surface 220 of the cover 106, e.g. instead of to the lower surface 218. The first portion 122 of the spacer 114 still extends into the contact aperture 110, but toward the lower surface 218 of the cover 106. Accordingly, the insulating member 112, which is coupled to the edge 126 of the spacer 114, extends below the cover 106, e.g., into the interior 202 when the header assembly 300 is coupled to a base (not shown in FIG. 3). As with the example of FIG. 2B, the alternative contact structures 108' are illustrated as including the flange 226 and the protrusion 228, with the protrusion 228 being coupled to the insulating member 112. Thus, unlike in the example of FIG. 2B, the flange 226 of the alterative contact structures 108' is disposed below the cover 106. The alternative contact structures 108' also include the threaded bore 230, which is formed in the end of the structures 108' extending from the upper surface 220 of the cover 106. As will be appreciated, the alternative contact structures 108' may extend a shorter distance from the cover 106 than the contact structure 108 of FIGS. 2A and 2B, which may further reduce an overall height of an electrical device incorporating the header assembly 300.

Figure 4:
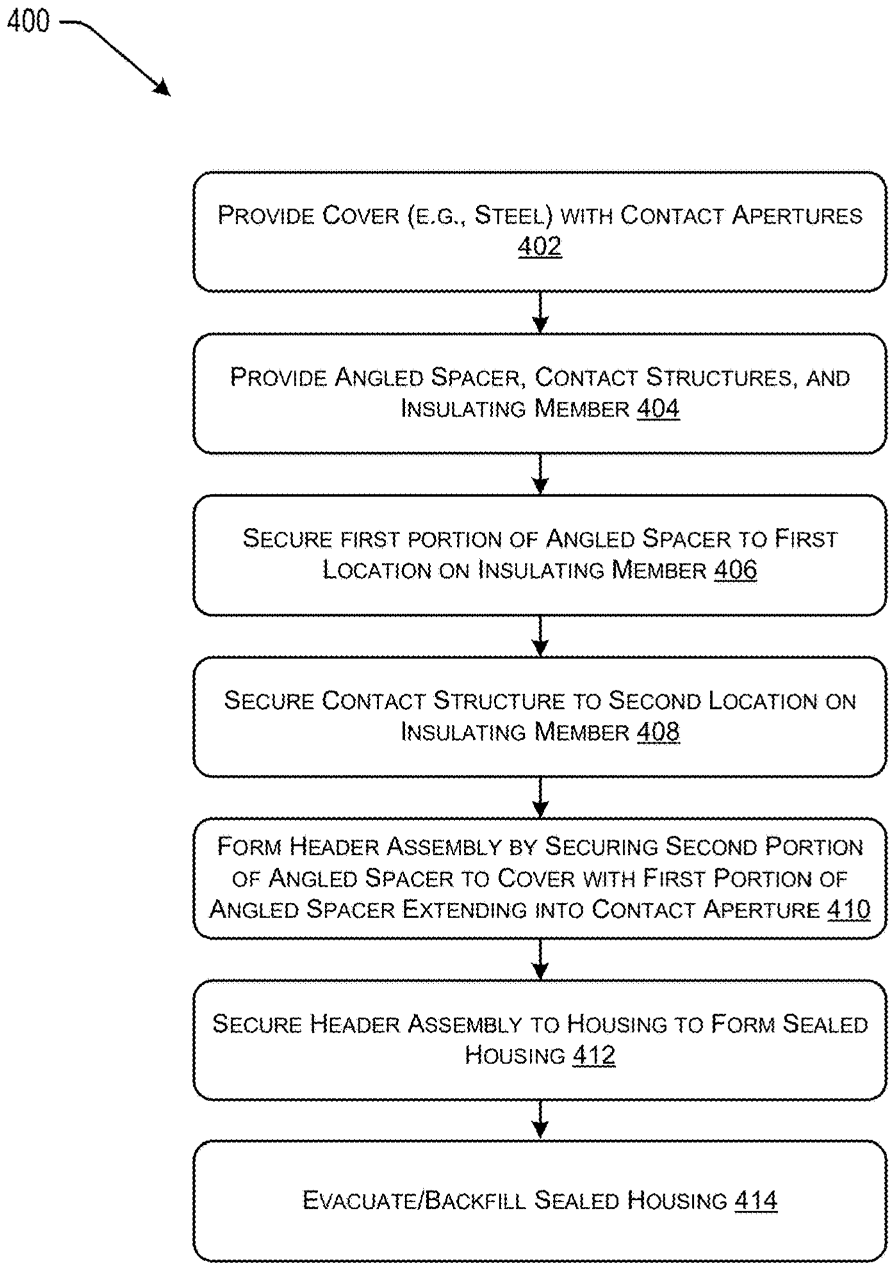
FIG. 4 is a flow chart illustrating aspects of a method of manufacturing an electrical device, such as the electrical device illustrated in FIG. 1, in accordance with aspects of this disclosure.

FIG. 4 is a flowchart showings aspects of a process 400, which may be a manufacturing process to form a hermetically-sealed electrical device, like the electrical device 100.

At an operation 402, the process 400 includes providing a cover with contact apertures. For example, the cover may be the cover 106 discussed above. For example, the cover 106 has a plurality of apertures, including the contact apertures 110. In examples, the cover 106 may be made of a metal, such as steel, stainless steel, or some other robust metallic material. In examples, the cover 106 need not be made of a dielectric material, e.g. because aspects of this disclosure include insulating the cover 106 from contacts configured to carry electricity.

At an operation 404, the process 400 includes providing, e.g., for each of the contact apertures, an angled spacer, a contact structure, and an insulating member. The angled spacer may be the spacer 114, the contact structure may be the contact structure 108, 108', and/or the insulating member may be the insulating member 112, described herein. The spacer may be formed of a metal, such as low carbon steel, and may be a bent structure including a first portion and a second portion bent relative to the first portion. The contact structure may be made of a highly conductive material, such as copper. The insulating member 112 may be made of a dielectric material, such as ceramic or the like.

At an operation 406, the process 400 includes securing a first portion of the angled spacer to a first location on the insulating member. For example, and as described above, the spacer 114 can include the first, generally cylindrical portion 122 terminating at the edge 126. The edge 126 can be secured to a side of the insulating member 112, e.g., such as the second side 224 in the example of FIG. 2B. In examples, the operation 406 can include brazing the insulating member 112 and the spacer 114.

At an operation 408, the process 400 includes securing the contact structure to a second location on the insulating member. For example, and as described above, contact structure 108 can include a flange 226, and the flange 226 may be secured to the first side 222 of the insulating member 112. The first side 222 and the second side 224 are spaced from each other a sufficient distance such that the contact structure and the angled spacer are insulated from each other. In examples, the operation 408 can include brazing the insulating member 112 and the contact structure 108.

At an operation 410, the process 400 includes forming a header assembly by securing a second portion of the angled spacer to the cover such that the first portion of the angled spacer extends into the contact aperture. As described herein, the spacer 114 can include the second, flanged portion 124 that is substantially perpendicular to the first portion 122. At the operation 410, the second portion 124 of the spacer 114 can be coupled to a surface, e.g., the bottom surface 218 of the cover 106 (as in FIGS. 1-2B) or the top surface 220 of the cover 106 (as in FIG. 3. In examples, the operation 410 can include brazing the spacer 114 to the cover 106.

Although the operations 406, 408, 410 are illustrated and described as separate and ordered steps, as will be appreciated, the operations 406, 408, 410 may be performed in a different order and/or in a single step, such as a single brazing step. For example, because brazing includes the application of heat, different brazes may be done contemporaneously, e.g., via the same application of heat, such as in a furnace or the like.

At an operation 412, the process 400 includes securing the assembly to a housing to form a sealed housing. For example, the assembly 104 may be secured to the housing using known methods, including welding, epoxy, and/or other processes.

At an operation 414, the process 400 can include evacuating the sealed housing. For example, ambient air in the housing after sealing may be removed and/or replaced with an electronegative gas, such as hydrogen, to provide a hermetically-sealed electrical device, like the electrical device 100.

As just described, aspects of this disclosure relate to providing electrical devices incorporating an improved header assembly that insulates a contact terminal from a cover. The header assemblies described herein can provide a number of benefits over conventional header assemblies.

In some aspects of this disclosure, a hermetically-sealed and electrically-insulative assembly for use in high-voltage DC contactors, fuses, and pyrotechnic fuses may make use of a unique arrangement of components and geometries that are joined using conventional brazing technology to reduce cost and improve performance in comparison to conventional sealed assemblies. For example, aspects of this disclosure may result in less copper waste associated with the contact terminals, e.g., because the contact terminals may be narrower than conventional terminals. Moreover, the brazed joints may be stronger than joints used in conventional header assemblies. Also, and as detailed above, the arrangements and techniques described herein may facilitate an overall shorter electrical device, e.g., because the contacts may not extend as far above the housing.

The hermetic glass-to-metal assemblies described herein also may utilize lower cost manufacturing methods in its raw materials, further reducing cost in comparison to existing ceramic-to-metal and epoxy sealing applications. For example, and without limitation, the techniques described herein can facilitate the use of metal, such as stainless steel, for a cover instead of more expensive and/or less robust materials.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. An electrical device comprising:

a housing; and a header assembly sealed to the housing, the header assembly comprising:

a cover, a contact aperture formed through the cover, a contact terminal disposed in the contact aperture such that a first end of the contact terminal is disposed in a volume defined by the housing and the header assembly, and a second end of the contact terminal is disposed outside the volume, an insulating member comprising a first surface and a second surface opposite the first surface, wherein the first surface is coupled to the contact terminal; and a spacer coupling the insulating member to the cover, the spacer comprising a first portion and a second portion angled relative to the first portion, wherein the first portion is coupled to the second surface of the insulating member and the second portion is coupled to the cover such that the first portion extends into the contact aperture.

2. The electrical device of claim 1, wherein the insulating member is disposed at least partially in the contact aperture.

3. The electrical device of claim 1, wherein:

the insulating member includes an aperture; and a body of the contact terminal extends through the aperture.

4. The electrical device of claim 1, wherein the insulating member comprises a ceramic member or a metallized ceramic member.

5. The electrical device of claim 1, wherein the first portion of the spacer is coupled to the second surface of the insulating member such that the first portion extends substantially perpendicularly from the second surface.

6. The electrical device of claim 1, wherein the first portion and the second portion are substantially perpendicular.

7. The electrical device of claim 1, wherein the first portion of the spacer is brazed to the second surface of the insulating member, and wherein the second surface of the insulating member includes a metallic layer.

8. The electrical device of claim 1, wherein the second portion of the spacer is brazed to the cover.

9. The electrical device of claim 1, wherein:

the second portion is coupled to an inner surface of the cover, the inner surface of the cover facing the volume; and the insulating member extends outwardly from the header assembly, relative an outer surface of the cover opposite the inner surface of the cover.

10. The electrical device of claim 1, wherein:

the second portion is coupled to an outer surface of the cover, opposite the volume; and the insulating member extends, relative to the cover, at least partially into the volume defined by the housing and the header assembly.

11. A header assembly for an electrical device, the header assembly comprising:

a cover, a contact aperture formed through the cover, a contact terminal disposed in the contact aperture, an insulating member coupled to the contact terminal; and a spacer coupling the insulating member to the cover, the spacer comprising a first portion and a second portion bent relative to the first portion, wherein the first portion is coupled to the insulating member and the second portion is coupled to the cover such that the first portion extends into the contact aperture.

12. The header assembly of claim 11, wherein:

the second portion is coupled to a first surface of the cover; and the insulating member protrudes from a second surface of the cover, opposite the first surface of the cover.

13. The header assembly of claim 11, wherein the insulating member is disposed at least partially in the contact aperture.

14. The header assembly of claim 11, wherein:
the insulating member includes an aperture; and
a body of the contact terminal extends through the aperture.

15. The header assembly of claim 11, wherein the insulating member comprises a ceramic member.

16. The header assembly of claim 11, wherein the first portion of the spacer is coupled to a surface of the insulating member such that the first portion extends substantially perpendicularly from the surface.

17. The header assembly of claim 11, wherein the first portion and the second portion are substantially perpendicular.

18. The header assembly of claim 11, wherein:
the insulating member comprises a metallic layer; and
the first portion of the spacer is brazed to the metallic layer.

19. The header assembly of claim 11, wherein the second portion of the spacer is brazed to the cover.

20. The header assembly of claim 11, wherein:
the insulating member is ring shaped;
an inner diameter of the insulating member forms a clearance fit a body of the contact terminal; and
an outer diameter of the insulating member formed a clearance fit with the contact aperture.

* * * * *